United States Patent Office 3,432,626
Patented Mar. 11, 1969

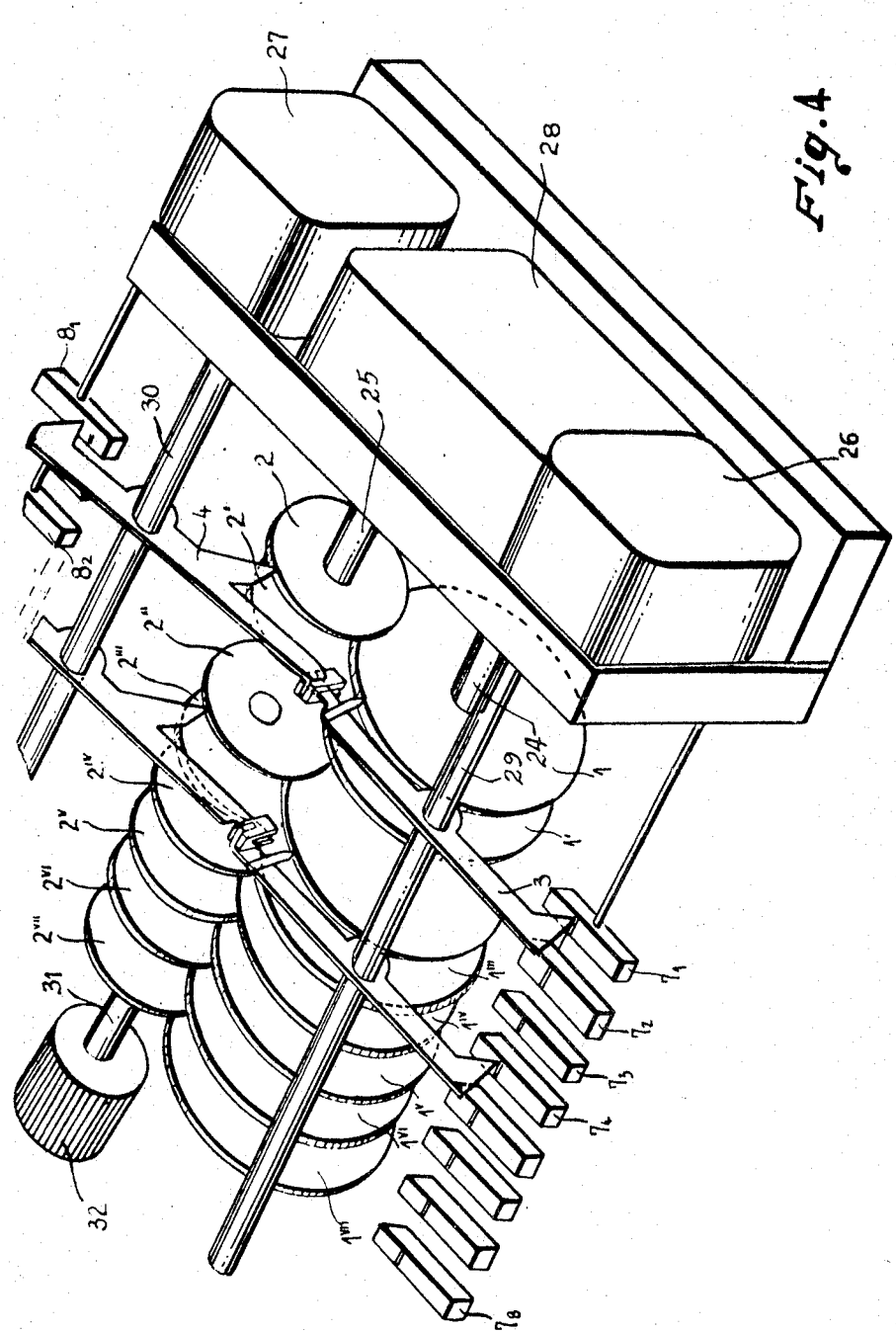

3,432,626
PROGRAMMING APPARATUS
Paul Bossard and Michel Chauvigne, Cluses, France, assignors to Carpano & Pons, Cluses, France, a French company
Filed Oct. 10, 1966, Ser. No. 585,648
Claims priority, application France, Oct. 14, 1965, 34,928
U.S. Cl. 200—38     7 Claims
Int. Cl. H01h 19/60, 19/62

ABSTRACT OF THE DISCLOSURE

Programmer having a first series of cams rigidly mounted on a motor driven shaft and a second series of cams mounted on a second motor driven shaft with the remainder of the second series on a manually actuated shaft. Two sets of interrupters controlling the programmed operations are manipulated by two sets of levers sensing the cam profiles and activating the interrupters in dependence upon the cam profiles. The two sets of levers coact by a pivotal connection between corresponding levers of the two sets to effect desired interaction between the first and second series of cams in activating the interrupters.

---

The present invention relates to a programming apparatus, particularly intended for the control of machines operating according to predetermined cycles, such as automatic washing machines. The apparatuses of this type generally comprise a series of multiple level cams mounted on a shaft driven by a synchronous motor and controlling, by the intermediary of levers cooperating with these cams, interrupters or reverses controlling the circuits of the devices assuring the execution of the various operations of the programme, for example, in the case of a washing machine, the admission and the evacuation of water, the more or less intense heating of the water, the rotation at a more or less rapid rhythm of the machine according to the operation controlled (washing, rinsing, drying, etc.) as well as the starting and stopping of the machine.

Furthermore, according to the nature of the work to be effected by the machine, it is necessary to be able to change the programme. To this end, certain known programmers comprise commutators or preselectors of the push button or rotating button type, for effecting the control of other interrupters or reversers inserted in the circuits controlled by the programming cams, and consequently modifying, according to whether they are open or closed, the execution or the duration of such and such other operation. Assemblies of this type require the use of a very large number of interrupters or reversers, thus increasing the price, the cumbersomeness, the complexity of the circuits and the risks of breakdown.

Furthermore, in the aim of simplification, it has been proposed, in French Patent No. 1,308,007 of the applicant company, to dispose in the programmer two series of cams mounted on separate shafts driven at different speeds by the same motor or by two distinct motors, the cams of one of the series constituting programme cams proper, and those of the other series controlling the cyclic operations of the machine, such as starting, stopping, reversing of the direction of rotation. In the addition No. 84,382 to the patent mentioned above, it has been proposed, in order to reduce the number of interrupters or reversers which must be used in the programmer to permit the cams controlling the cyclic operations to act not only on the interrupters corresponding to these operations, but also, with the aid of auxiliary levers, to actuate the interrupters normally controlled by the programming cams, or to cancel the action of these programming cams on their interrupters, this arrangement permitting economy of the interrupters by realising with a smaller number of interrupters the same number of combinations corresponding to the different phases of the programme.

The present invention relates to a programmer of the type described in Patent No. 1,308,007, that is to say comprising two shafts carrying respectively two series of cams having several levels actuating interrupters or reversers by means of levers, and it has for its subject, on the one hand a mechanical simplification of the arrangement forming the subject of addition No. 84,384 mentioned hereabove, and the extension of this same mechanical arrangement to the realisation of a commutator or programme preselector. The programmer forming the subject of the present invention is characterised by the fact that the levers actuated respectively by the two series of cams are mechanically coupled among themselves in a way to assure an interaction of the cams of the two series.

The cams of the second series comprise, on the one hand, cams controlling the cyclic operations and mounted on a permanent turning shaft, and on the other hand, preselection cams mounted on a shaft coaxial to the preceding one and manually controlled.

According to one embodiment of the invention, the ends of the pivoting levers cooperating with the cams of the two series of cams mounted on shafts parallel among themselves, comprise extensions in the form of beaks in contact with one another, the levers of the cams of the second shaft bearing respectively by their beaks against the beaks of the levers of the cams of the first shaft or inversely, so that, according to the level of the cams of a shaft on which the corresponding levers are applied, the actuation by the cams of the other shaft of the levers which are subordinated to them, are authorised or forbidden.

By way of example, one embodiment of the programmer forming the subject of the invention has been described here-below and represented in the accompanying drawings.

FIGURE 4 shows schematically the assembly of the programmer.

Figure 1:
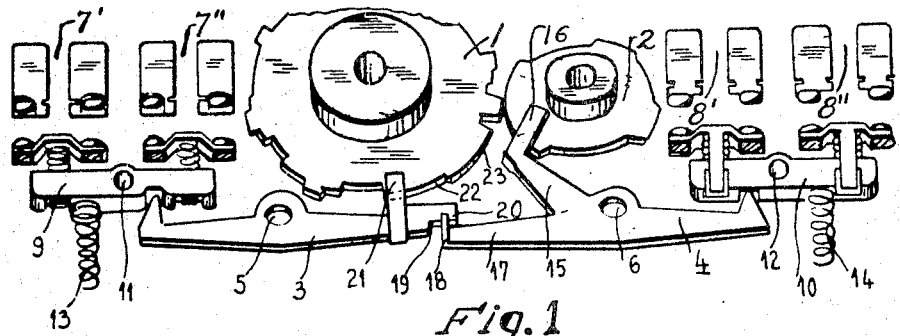
FIGURE 1 shows in perspective two cams belonging to two shafts of the programmer with their levers and the interrupters controlled by these latter.

As shown in FIGURE 1, the apparatus comprises two series of cams mounted on two parallel shafts (not shown in this figure), in which only two cams 1 and 2 belonging respectively to these two series have been shown. These cams have generally three different levels and they cooperate with oscillating levers 3 and 4 respectively pivoted at 5 and 6 and actuating interrupters or rocking reversers 7', 7" and 8', 8" whose movable contacts are carried by a piece 9, 10 pivoted at 11, 12 and provided with a return spring 13, 14 which assures at the same time the application of the corresponding lever 3 or 4 on its cam 1 or 2. The lever 4 of the cam 2 comprises, in addition to the arm 15 carrying a beak in the form of a stirrup piece 16 bearing by its bottom against the profile of the cam 2, an arm 17 carrying at its end a beak 18 freely engaged in a notch 19 formed on the end 20 of the lever 3 of the cam 1, the end having a beak in the form of a stirrup piece 21 extending therefrom, by which this lever 3 is applied against the profile of the cam 1. The beak 18 of the lever 4 is applied in the notch 19 of the lever 3 by the action of the return springs of the interrupters 7 and 8. The cams and their levers are dimensioned so that, for a middle level of the cam, the two contacts, for example 8′, 8″, of the corresponding reverser are open, one of the contacts, for example 8′ being closed when the lever is located at the high level of the cam, and the contact 8″ being closed when the lever is located at the low level of the cam.

Figure 2:
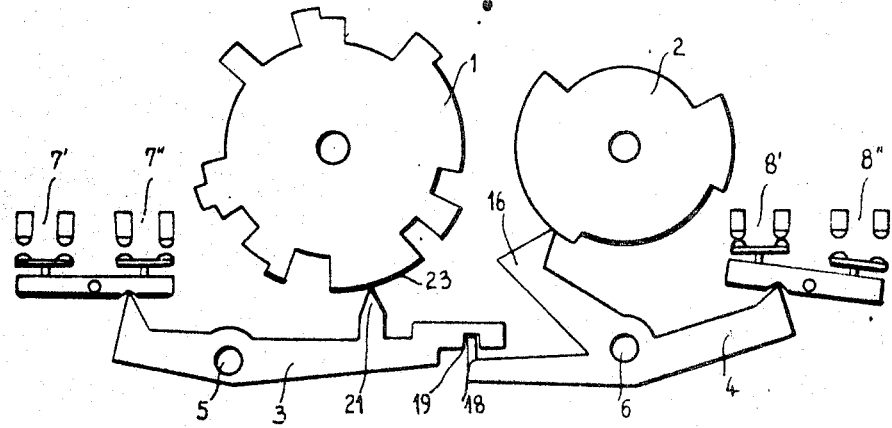
FIGURE 2 shows schematically in elevation the assembly shown on FIGURE 1, the two cams being located in a different position.

It is understood that due to this arrangement and with a suitable dimensioning of the cams 1, 2 and of the levers 3, 4, the lever 3 of the cam 1 can influence the opening of the interrupter 8 normally controlled by the lever 4 of the cam 2: for example, as shown in FIGURE 1, the lever 3 is applied against a middle level 22 of the cam 1, the lever 4 is raised by the lever 3 by a suitable height to be prevented from bearing against a low level of the cam 2; by contrast, it can, in this position of the lever 3, bear against the middle and high levels of the cam 2. In the case where, as shown in FIGURE 2, the beak 21 of the lever 3 is in contact with a high level 23 of the cam 1, the lever 4 will only be able to bear against a high level of the profile of the cam 2, so that the operations controlled by the middle and low levels of the cam 2, that is to say the closing of the contact 8″ or the simultaneous opening of the contact 8′ and 8″, are forbidden. On the contrary, when the lever 3 is at the low level of the cam 1, the lever 4 will be able to be actuated by the three levels of the cam 2, without any limitation or forbidding.

This arrangement is particularly useful when the cams 1 are programme cams and the cams are cams controlling the cyclic operations, in particular the starting, stopping or reversing of the direction of rotation of the machine, operations which can thus be forbidden by simple interaction of the levers when the programme cams occupy certain positions, whereas without this interaction, these events would require as many supplementary interrupters inserted in the circuits controlled by the cams 2.

Figure 3:
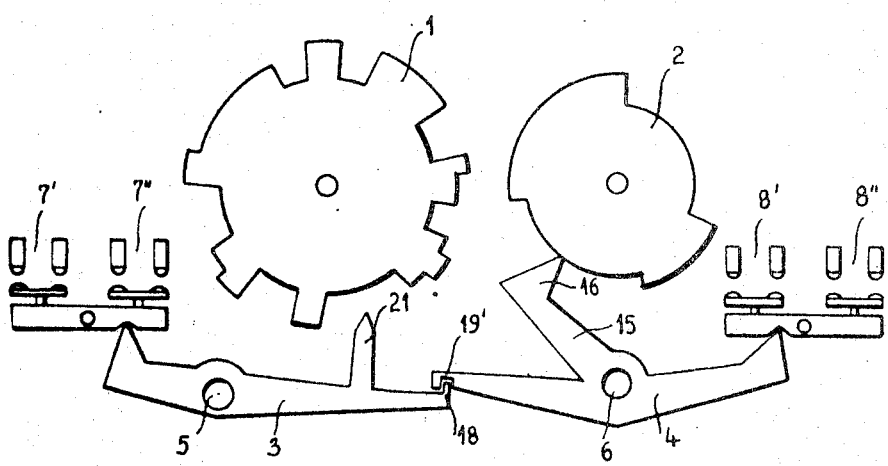
FIGURE 3 is a view similar to that of FIGURE 2 but in which the system of interaction of the levers of the two series of cams is reversed.

FIGURE 3 shows the reverse arrangement in which the end of the lever 3 is located at the outside and bears by its beak 18′ in the notch 19′ formed on the lever 4; in this case, it is on the contrary the cam 2 which influences the operations executed under the action of the programme cam 1: this arrangement is thus particularly applicable to the realisation of a commutator or programme preselector. In this case, cams such as 2 are mounted on a manualy controlled shaft whose different angular positions would correspond to the different programmes adapted to be executed by the machine.

FIGURE 4 shows, in a schematic way, the assembly of mechanical members of a programmer using the devices shown in FIGURES 1 to 3. This programmer comprises two shafts 24 and 25 which can be driven by synchronous motors 26 and 27 by the intermediary of gears which are housed, with certain control devices in the casing schematically represented at 28. The shaft 24 carries programme cams 1, 1′, 1″, 1‴ . . . etc., for example eight in number, shown in the form of discs so as not to overload the drawing, it being understood that in reality these are three level cams of the type shown in FIGURES 1 to 3. These cams control interrupters $7_1, 7_2, 7_3 \ldots 7_8$ by the intermediary of levers $3_1, 3_2, 3_3 \ldots$ (only one of which has been shown) pivoting on an axial 29. The shaft 25 carries two cams 2 and 2′ intended to control the cyclic operations, and actuates interrupters $8_1$ and $8_2$ by the levers $4_1$ and $4_2$ pivoting on an axial 30, the levers 3–4 and 3′–4′ being coupled among themselves in the way shown in FIGURE 1, that is to say that the operation of the interrupters 8 actuated by the cyclic cams 2 and 2′ is subordinated to the programme cams 1 and 1′.

In line with the shaft 25 carrying the cyclic cams 2 and 2′ is disposed a third shaft 31 carrying analogous came 2″, 2‴, $2^{IV}$ . . . $2^{VII}$ lying adjacent to the programme cams 1″, 1‴, $1^{IV}$ . . . $1^{VII}$, 3″–$3^{VII}$ and 4″–$4^{VII}$ of these two series of cams being respectively the levers coupled among themselves two by two in the way shown in FIGURE 3 so as to make the operations controlled by the cam 1″–$1^{VII}$ depend on the angular positions occupied by the corresponding cams 2″–$2^{VII}$ on the shaft 31. This shaft 31 is controlled manually with the aid of the button 32, the assembly of this shaft 29, the cams 2′–$2^{VII}$ which it carries and the interrupters actuated by these cams with the aid of the levers 3″–$3^{VII}$ forming the commutator or the programme preselector.

What is claimed is:

1. Programmer apparatus for controlling machines operating according to predetermined cycles, comprising
   (A) a first series of cams,
   (B) and a second series of cams,
   (C) each cam of said series and of said second series having cam surfaces at a plurality of levels,
   (D) said first series of cams being rigidly mounted on a first shaft driven by first driving means,
   (E) and some of said second series of cams being rigidly mounted on a second shaft driven by second driving means,
   (F) a plurality of first interrupters,
   (G) and a plurality of second interrupters,
   (H) a plurality of pivotably mounted first levers adapted to co-operate with said cam surfaces of said first cams and to actuate said first interrupters,
   (I) a plurality of pivotably mounted second levers adapted to co-operate with said cam surfaces of said second cams and to actuate said second interrupters,
   (J) said second levers being mechanically coupled to said first levers whereby to ensure an interaction between said first and second series of cams.

2. Apparatus according to claim 1 in which the rest of said second series of cams are rigidly mounted on a third shaft, said third shaft being manually controlled.

3. Apparatus according to claim 2 in which said first driving means is a first synchronous motor and said second driving means is a second synchronous motor, said third shaft being coaxial with said second shaft, and said second and third shafts being parallel to said first shaft.

4. Apparatus according to claim 1 in which said first and second pivotable levers are provided on one end with extensions in contact with one another, while the other ends of said levers control said interrupters, said interrupters being provided with return springs.

5. Apparatus according to claim 4 in which said extensions are biased into contact with one another by means of a spring.

6. Apparatus according to claim 5 in which said spring is said return spring of the corresponding interrupter.

7. Apparatus according to claim 4 in which said first and second levers are provided with protuberances adapted to co-operate with said cam surfaces, said protuberances having a form suitable for assuring guiding of said lever on its corresponding cam.

References Cited

UNITED STATES PATENTS 3,123,683   3/1964   Lewis et al.
3,380,365   4/1968   Umahashi.

FOREIGN PATENTS 1,137,498   10/1962   Germany.

ROBERT K. SCHAEFER, *Primary Examiner.*

H. O. JONES, *Assistant Examiner.*